May 8, 1951   J. C. HAUN ET AL   2,552,376
PLUG VALVE
Filed March 5, 1947   3 Sheets-Sheet 1
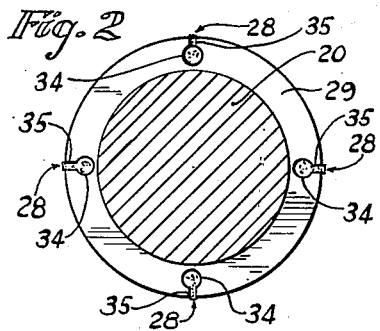
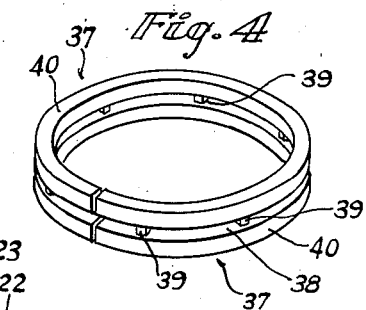
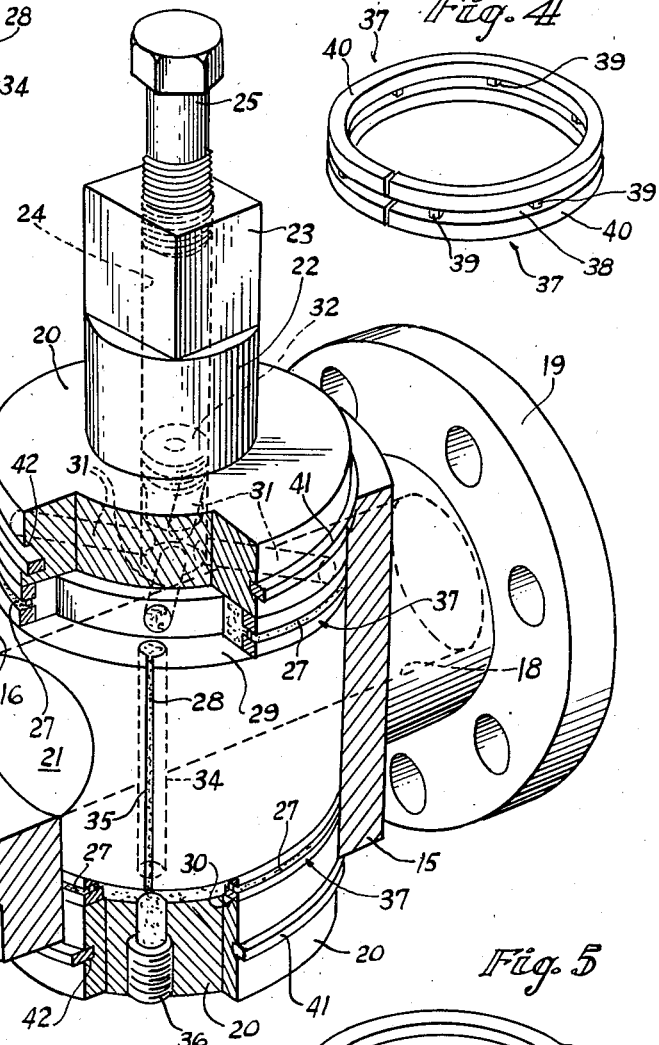
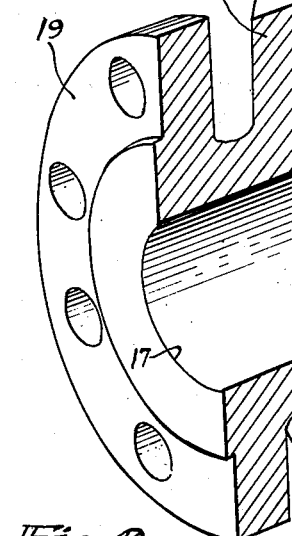
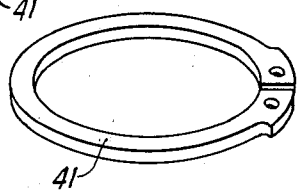
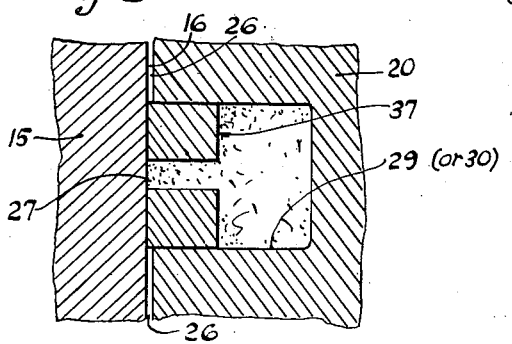
INVENTORS
Joye C. Haun, deceased
(Florence Patricia Mills, Executrix)
and John H. Carter
By Albert G. McCaleb
Attorney

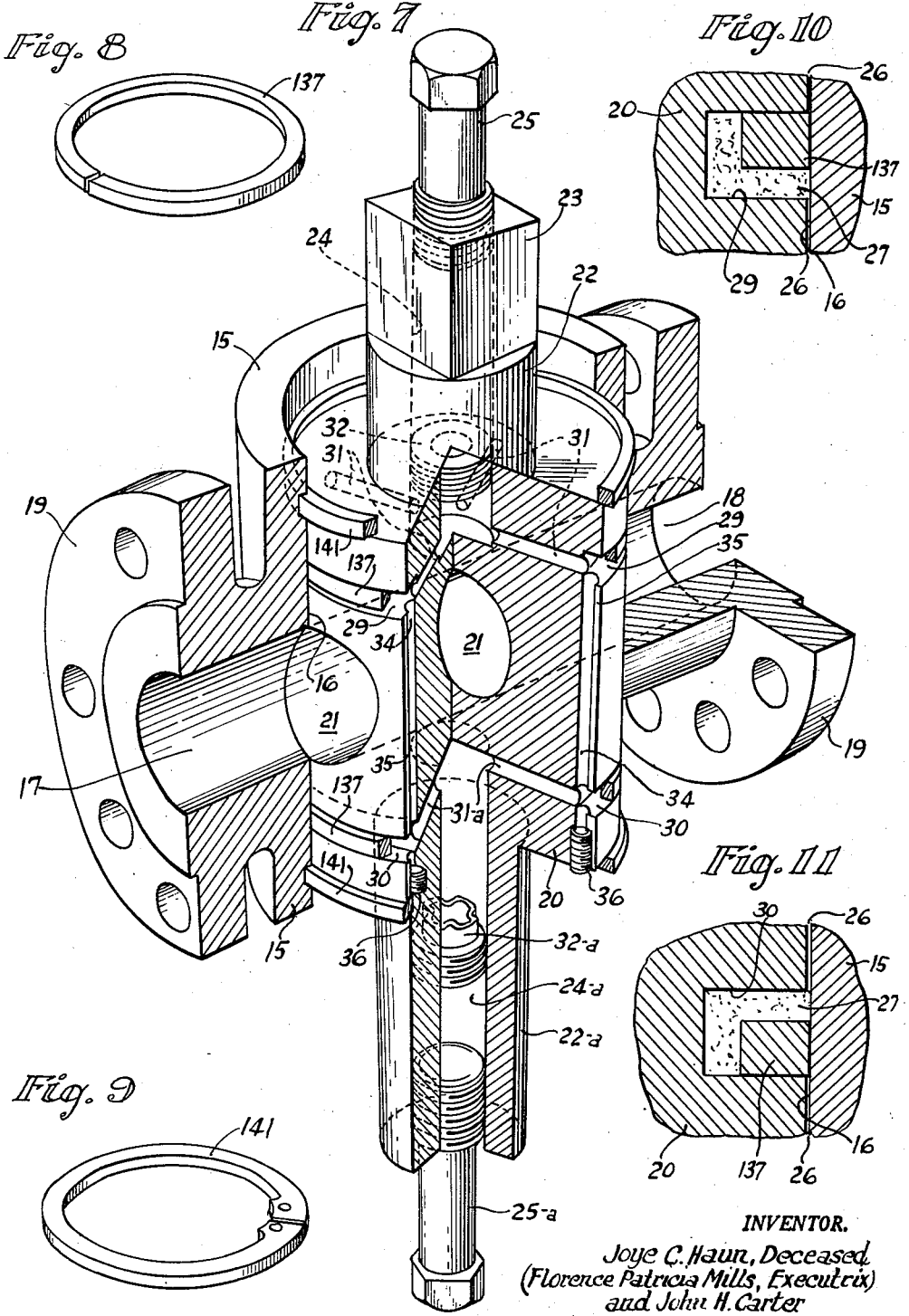

May 8, 1951 J. C. HAUN ET AL 2,552,376
PLUG VALVE
Filed March 5, 1947 3 Sheets-Sheet 3
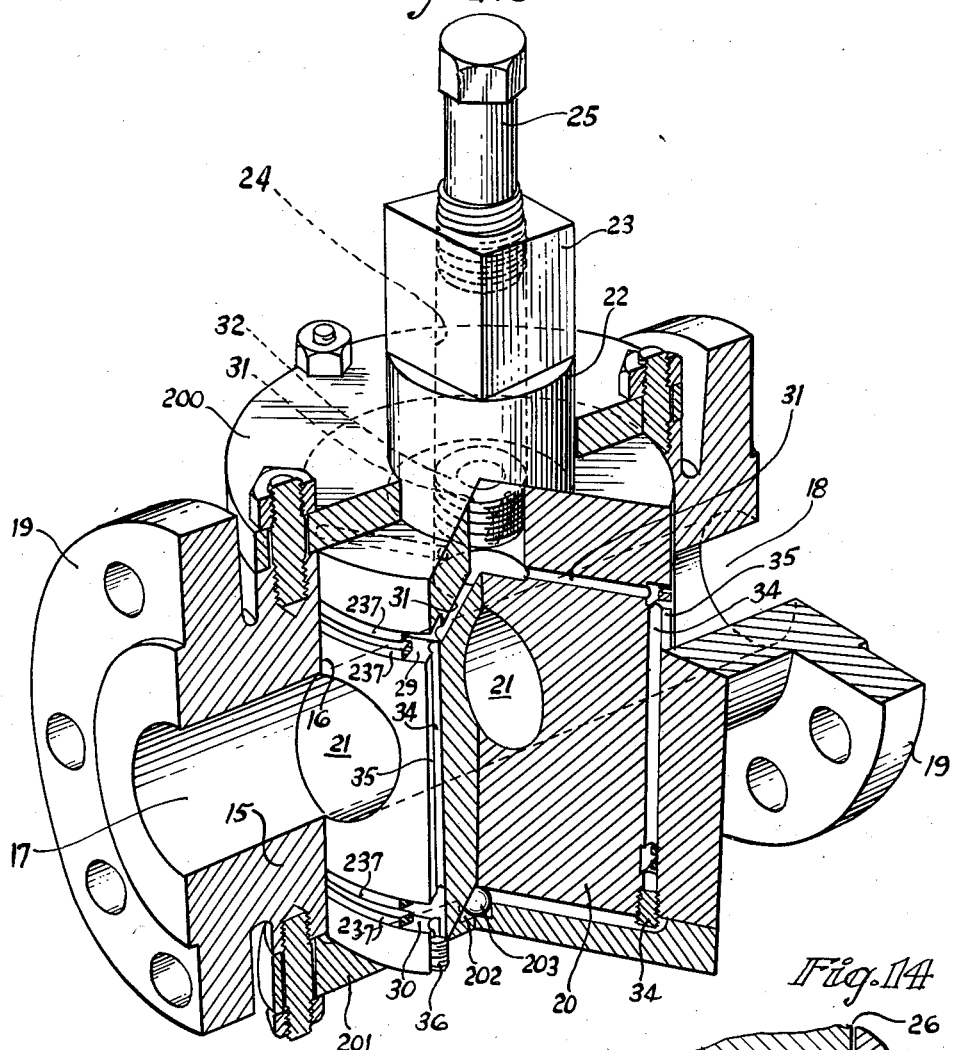
INVENTOR.
Joye C. Haun, Deceased
(Florence Patricia Mills, Executrix)
and John H. Carter
By Albert G. McCaleb
Attorney Patented May 8, 1951

2,552,376

UNITED STATES PATENT OFFICE 2,552,376

PLUG VALVE

Joye C. Haun, deceased, late of San Francisco, Calif., by Florence Patricia Mills, executrix, Wallowa, Oreg., and John H. Carter, Portland, Oreg.; said Carter assignor to Electric Steel Foundry, Portland, Oreg., a corporation of Oregon; said Mills, executrix, assignor to Florence Patricia Mills, Wallowa, Oreg.

Application March 5, 1947, Serial No. 732,480

7 Claims. (Cl. 251—103)

This invention relates to plug valves.

Several features of the present invention relate particularly and peculiarly to plug valves which are sealed against leakage between plug and body by what have come to be known as plastic metallic gaskets. Such gaskets desirably are maintained under pressure at all times. They are formed of extrudable packing material comprising particles of metal such as, for example, lead in a rubberlike base or carrier such as, for example, polymerized chloroprene. Carter Patent No. 2,286,260 granted June 16, 1942, discloses such a packing material, and Carter Patent No. 2,250,124 granted July 22, 1941, discloses a plug valve incorporating plastic metallic gaskets formed of such a packing material. Other features of the invention are of more general application.

General objects of this invention are to simplify the structure and reduce the manufacturing cost and improve the performance of plug valves.

Another object of this invention is to provide improved plug valves which are sealed by plastic metallic gaskets against leakage between plug and body.

Another object of this invention is to provide plug valves, of the kind sealed with plastic metallic gaskets, wherein neither line pressures nor internal packing pressures exert upon the plugs forces tending to move them longitudinally of their rotary axes.

Another object of the invention is to provide plug valves, of the kind sealed with plastic metallic gaskets, wherein it is practical to extrude through slots from plug ducts those gaskets which extend circumferentially of the plugs.

Another object of the invention is to provide plug valves, of the kind sealed with plastic metallic gaskets, wherein it is practical to extrude all of the gaskets through slots from plug ducts.

Another object of the invention is to provide improved plug valves which, being practicably and effectively sealed against leakage between their plugs and bodies, require no bottoms or covers for the bodies.

Yet another object of the invention is to provide improved plug valves which can be and are practicably and effectively sealed against leakage between their plugs and bodies despite that there is no metal-to-metal fit between them which can result in seizing or freezing of the plugs in the bodies.

A salient feature of this invention is the utilization, in annular grooves of the valve plugs, of rings defining the ducts and slots from and through which are extruded and maintained under pressure plastic metallic gaskets, of appropriately substantial but practically limited cross section, backed up by gasket material supply bodies of considerably greater cross section.

The foregoing and other objects, features and advantages of the present invention will appear from the following detailed description wherein reference is made to the accompanying three sheets of drawings wherein:

Fig. 1 is a perspective view, with various parts depicted in section, of a plug valve embodying the present invention;

Fig. 2 is a view partly in section of the valve plug of Fig. 1 which may be regarded as taken in and looking downwardly from the horizontal plane which immediately underlies the upper one of the rings through which annular plastic metallic gaskets are extruded;

Fig. 3 is an isolated axial sectional view of the non-return valve carried within the valve plug of Fig. 1;

Fig. 4 is an isolated perspective view of what may be regarded as either of the two rings through which are extruded the annular plastic metallic gaskets of Fig. 1;

Fig. 5 is an isolated perspective view of what may be regarded as either of the two retainer rings associated with the valve plug of Fig. 1;

Fig. 6 is an enlarged fragmentary sectional view (with certain clearances exaggerated) which may be regarded as taken in a vertical radial plane through either of the annular plastic metallic gaskets of Fig. 1;

Fig. 7 is a perspective view, with various parts depicted in section, of a modified form of plug valve (packing omitted) embodying the present invention;

Fig. 8 is an isolated perspective view of what may be regarded as either of the two rings past which are extruded the annular plastic metallic gaskets of Fig. 7;

Fig. 9 is an isolated perspective view of what may be regarded as either of the two retainer rings associated with the valve plug of Fig. 7;

Fig. 10 is an enlarged fragmentary sectional view (with certain clearances exaggerated) which may be regarded as taken in a vertical radial plane through the upper one of the annular plastic metallic gaskets existing in the valve of Fig. 7 when it is ready for service;

Fig. 11 is a view similar to Fig. 10 taken through the lower one of the annular plastic metallic gaskets existing in the valve of Fig. 7 when it is ready for service;

Fig. 12 is a perspective view, with various parts depicted in section, of another modified form of plug valve (packing omitted) embodying the present invention;

Fig. 13 is an isolated perspective view of what may be regarded as any of the four rings past which are extruded the annular plastic metallic gaskets of Fig. 12; and Fig. 14 is an enlarged fragmentary sectional view (with certain clearances exaggerated) which may be regarded as taken in a vertical radial plane through either of the annular plastic metallic gaskets existing in the valve of Fig. 12 when it is ready for service.

Similar characters of reference refer to similar parts throughout the several views.

Reference first will be made to Figs. 1 to 6. The valve there depicted comprises a body 15 provided with a cylindrical plug-receiving bore 16 and lateral flow line openings 17 and 18. Conventional flanges 19—19, or their equivalent, facilitate the inclusion of the valve in a fluid pressure line which it is to control.

The plug 20 is cylindrical and is provided with a port 21 for registry with the flow line openings 17 and 18. Plug 20 also is provided with at least one stem 22, desirably an integral part of the plug, which is conformed at 23 for cooperation with a wrench or equivalent instrumentality whereby the plug is turned in body 15.

Stem 22 is provided with a bore 24 which constitutes a reservoir for the packing material. The open end of bore 24 is threaded for cooperation with a screw 25 with which the packing material is compressed.

The major diameter of plug 20 is made smaller, e. g., by at least one or two-thousandths of an inch, than the internal diameter of the valve body 15 to insure definite clearance 26 (see Fig. 6) between the opposed surfaces of the plug and body—the hereinafter-to-be-discussed plastic metallic gaskets being relied upon to prevent leakage of line fluid through clearance 26 and to suspend the plug within but out of contact with the valve body.

The plug 20 presents to the body bore 16 circumferentially and axially extending slots through which are extruded plastic metallic gaskets which, when the valve is either opened or closed, completely surround both ends of plug port 21 and both of the flow line openings 17 and 18, appropriately to suspend the plug within the body and to prevent line fluid leakage between the plug and body. The gaskets extruded through the circumferentially extending slots are depicted at 27 and those extruded through the axially extending slots are depicted at 28.

Experience has shown that a plastic metallic gasket which is to be accorded and maintained at the density requisite to necessary mechanical strength and optimum sealing ability, without creating too much frictional resistance to the opening and closing of a valve incorporating it, usually should be extruded through a slot which is neither substantially less nor substantially more than $\frac{1}{16}''$ in width. Experience also has demonstrated that such a gasket can be satisfactorily formed and maintained only when backed up by a supply body under pressure occupying a duct having a cross section substantially greater than that of the slot through which the gasket is extruded. Because of these considerations it was not possible prior to the present invention to extrude satisfactory annular or other circumferentially extending plastic metallic gaskets from commercially acceptable or reasonably-easy-to-manufacture valve plugs.

Essential to the formation and maintenance of the circumferentially extending plastic metallic gaskets 27 are grooves 29 and 30 which are formed in and encircle the plug 20 and are disposed, respectively, above and below its port 21. These grooves desirably are rectangular in cross section.

Bores 31, of which there are preferably four disposed 90° apart, extend radially of plug 20 to afford communication between groove 29 and the blind lower end of plug stem bore 24 which, as previously explained, constitutes a reservoir for packing to be compressed by screw 25. A conventional check valve unit 32, threadedly or otherwise suitably retained in the bore or reservoir 24 at a point slightly above the inner ends of radial bores 31, comprises a ball 33 seating toward screw 25. Bores 34 extend axially of the plug 20 to connect lower annular groove 30 with upper annular groove 29, and to constitute ducts from whence plastic metallic gaskets 28 are extruded through slots 35. There are preferably four of the bores 34, with each of them occupying the vertical plane of one of the radial bores 31. This places the outer end of each bore 31 in immediate proximity to the upper end of a bore 34, and thereby facilitates the movement of packing material into the bores or ducts 34 under pressure developed in reservoir 24 by screw 25. The lower ends of bores 34 are suitably sealed as by threaded plugs 36.

Attention is now directed to the split rings 37. One of these rings 37 is disposed in each of the annular slots 29 and 30. They define the ducts from whence and the slots through which the circumferentially extending plastic metallic gaskets 27 are extruded. Such ducts, being the spaces between the inner faces of the rings 37 and the opposed walls of the grooves in which they are located, accommodate ample supply bodies of packing material backing up the gaskets 27. Such slots are the ring slots 38 which, at intervals, are bridged by small webs 39 integral with the spaced-apart ring portions 40.

A pair of split retainer rings 41, contracting into annular grooves 42 formed in the valve plug 20 near its ends, with each of said rings 41 in contiguous opposition to an end of valve body 15, suffices to prevent the plug 20 being axially displaced with respect to body 15. Neither bonnet nor bottom cover is required for the body of this valve, because in the service of the valve no internal vertically directed forces, derived either from line pressures or packing system pressures, are exerted upon the valve plug.

Packing material suitable for the formation of the requisite plastic metallic gaskets is supplied, preferably in sticks, to the reservoir 24 and forced downwardly therein with the aid of screw 25 until the reservoir space under the screw, the several radial bores 31, the duct constituted by the annular space within the ring 37 occupying the upper circumferential groove 29 of the plug, the four ducts constituted by bores 34 of the plug, and the duct constituted by the annular space within the ring 37 occupying the lower circumferential groove 30 of the plug, as well as the circumferential gasket extruding slots 38 of the rings 37 and the axially extending gasket extruding slots 35 communicating with the plug bores 34, are entirely filled with packing material under appropriate substantial pressure created by screw 25 and maintained by check valve 32. From time to time and as required, additional packing material is supplied to reservoir 22 and put under pressure by operation of screw 25.

The valve depicted in Figs. 7 to 11 is similar to the one exhibited in the preceding figures in that it comprises: body 15 having plug-receiving bore 16, flow line openings 17 and 18, and attachment flanges 19; cylindrical plug 20 having port 21, stem 22 having polygonal end 23, and reservoir 24 within which packing material is compressed by screw 25; the small but essential clearance 26 between the plug 20 and body bore 16; the upper and lower annular grooves 29 and 30 in the plug; the four radial bores 31 of the plug; the check valve unit 32 in the reservoir 24; the four axially extending bores or ducts 34 of the plug; the slots 35 through which the axially extending gaskets 28 of the plug are extruded; and the several sealing plugs 36 for the lower ends of the bores or ducts 34.

The valve of Figs. 7 to 11 differs from the valve of Figs. 1 to 6 in these respects:

(A) Its plug 20 has extending downwardly therefrom a second integral stem 22a which need not be adapted for cooperation with a wrench or the like. Stem 22a is provided with screw 25a which serves to compress packing material in a reservoir 24a equipped with a check valve 32a whose ball (not shown) seats downwardly, i. e., toward the screw 25a. The plug bores 31a, of which there are four located 90° apart, radiate from the upper or blind end of reservoir 24a to the lower annular plug groove 30. The application of packing from both ends of the plug 20, as is facilitated by providing the subject valve with the two stems 22 and 22a and their appurtenances, frequently is desirable.

(B) Plug 20 is held against axial displacement from body 20 by a pair of split retainer rings 141 which bear against the upper and lower ends of the plug and expand into annular grooves formed in the valve body 15 which, in this instance, extends upwardly and downwardly beyond the ends of the plug.

(C) Disposed in the upper annular groove 29 of the plug, and in the lower annular groove 30 thereof, are simple compression rings 137 which cooperate with said grooves to define the slots through which are extruded the circumferentially extending plastic metallic gaskets 27 and to define the annular ducts for the supply bodies of packing material which back up those gaskets 27. It will be noted that the ring 137 in the upper groove 29 lies immediately adjacent to the upper wall of the groove and is spaced away from its lower wall (see Fig. 10); whereas the ring 137 in the lower groove 30 lies immediately adjacent to the lower wall of such groove and is spaced away from its upper wall (see Fig. 11). Minor quantities of the packing material pressed into what are to become the extrusion slots for the circumferentially extending gaskets 27 properly will locate the rings 137 in their respective plug grooves 29 and 30 before the plug is assembled with the valve body 20.

The valve depicted in Figs. 12 to 14 is similar to the one exhibited in Figs. 1 to 6 in that it comprises: Body 15 having plug-receiving bore 16; flow line openings 17 and 18, and attachment flanges 19; cylindrical plug 20 having port 21, stem 22 having polygonal end 23 and reservoir 24 within which packing material is compressed by screw 25; the small but essential clearance 26 between the plug 20 and body bore 16; the upper and lower annular grooves 29 and 30 in the plug; the four radially extending bores 31 of the plug; the check valve unit 32; the four axially extending bores or ducts 34 of the plug; the slots 35 through which the axially extending gaskets of the plug are extruded, and the several sealing plugs 36 for the lower ends of the bores or ducts 34.

The valve of Figs. 12 to 14 differs from the valves of the preceding figures in these respects:

(A) Displacement of the plug 20 from the body 15 is prevented by the bolted-on body bonnet 200 and the bolted-on body bottom 201. Body bottom 201 desirably is provided in the center of its upper surface with a recess 202 for the reception of an anti-friction ball 203 upon which the plug 20 rests.

(B) Disposed in the upper annular groove 29 of the plug 20, and in the lower annular groove 30 thereof, are the pairs of spaced-apart rings 237—237, which cooperate with said grooves to define the slots through which are extruded the circumferentially extending plastic metallic gaskets 27 and to define the annular ducts for the supply bodies of packing material backing up those gaskets 27. It will be noted that each of the rings 237 lies closely adjacent to either the upper or lower wall of the groove 29 or 30 which it occupies and that the rings 237 in each such groove are spaced from each other to define the slot through which the plastic metallic gasket 27 is extruded. Minor quantities of the packing material pressed into what are to become the extrusion slots for the plastic metallic gaskets 27 properly will locate the pairs of spaced-apart rings 237 in their grooves 29 or 30 prior to the assembly of the valve plug 20 with the valve body 15.

While we have illustrated and described three specifically different ring-in-groove arrangements for defining the slots through which are extruded the circumferentially extending plastic metallic gaskets of the valve plugs and for defining the ducts for the supply bodies of relatively greater cross section which back up those gaskets, it should be borne in mind that, generally speaking, each of such three arrangements is the equivalent of each of the others. Each of those three arrangements may be utilized in any of the three illustrative valves herein shown and described or in any other valve embodying the instant invention.

What is claimed as new and coverable by Letters Patent of the United States is:

1. In a valve wherein plastic metallic gaskets are utilized to prevent leakage and minimize direct contact between a plug and a body in which the plug is loosely fitted, a body provided with flow line openings, a cylindrical plug rotatable in the body and provided with a port cooperating with said flow line openings, grooves formed in and encircling the plug on opposite sides of the port, rings disposed in the grooves and cooperating therewith to define circumferentially extending gasket extrusion slots, and ducts for bodies of packing material which back up and are of greater cross section than the gaskets extruded through said slots, other relatively narrow gasket extrusion slots extending axially of the plug from groove to groove on opposite sides of each end of the plug port, ducts in the plug comprising axial bores of a diameter greater than the width of the last-mentioned extrusion slots extending from groove to groove at positions inwardly of the cylindrical plug surface and from which said last-mentioned extrusion slots open radially of the plug, and means for supplying packing material under pressure to said ducts.

2. A valve as specified in claim 1 wherein the grooves are of rectangular cross section and the radial surfaces of each ring are flat and parallel.

3. A valve as specified in claim 1 wherein at least one of the rings is itself circumferentially slotted and is of sufficient axial thickness to prevent the extrusion of packing material between it and the groove walls intermediate which it lies.

4. A valve as specified in claim 1 wherein at least one of the grooves is occupied by two axially spaced-apart rings having a combined axial thickness substantially less than the spacing of the groove walls intermediate which the rings lie, so that a gasket may be extruded between the opposed faces of said rings.

5. A valve as specified in claim 1 wherein the means for supplying packing material to the ducts includes a reservoir in the plug, a screw for compressing packing material in said reservoir and passages extending radially of the plug between the ducts and the reservoir and in substantial alignment radially of the plug with said axial bores for the occupancy of packing material.

6. A valve as specified in claim 1 wherein the means for supplying packing material to the ducts includes a reservoir in the plug, a screw for compressing packing material in said reservoir, passages between the ducts and the reservoir extending radially and internally of the plug for the occupancy of packing material, and devices functioning to prevent movement of packing material into the reservoir from said passages.

7. A valve comprising a body provided with flow line openings and a cylindrical through opening for the reception of a plug, a ported cylindrical plug occupying and loosely fitting said opening, and a packing system for suspending the plug in the body and preventing leakage of line fluid between the plug and body without exerting upon the plug any force tending to move it axially, said packing system comprising grooves of rectangular cross section formed in and encircling the plug on opposite sides of the port, rings disposed in the grooves and cooperating therewith to define circumferentially extending gasket extrusion slots and ducts for bodies of packing material which back up and are of greater cross section than the gaskets extruded through said slots, other gasket extrusion slots extending from groove to groove on opposite sides of each of the plug port, axial ducts in the plug communicating at their opposite ends with said grooves and being larger in cross-section than said other gasket extrusion slots and from which such last-mentioned extrusion slots open for continuous communciation from groove to groove and means segregated from the body for supplying packing material under pressure to said ducts.

FLORENCE PATRICIA MILLS,
*Executrix of the Last Will and Testament of Joye C. Haun, Deceased.*
JOHN H. CARTER.

REFERENCES CITED

The following references are of record in the file of this patent:

UNITED STATES PATENTS

| Number | Name | Date |
| --- | --- | --- |
| 2,030,408 | Sherman | Feb. 11, 1936 |
| 2,250,124 | Carter | July 22, 1941 |
| 2,308,399 | Strecker | Jan. 12, 1943 |
| 2,319,943 | Nordstrom | May 25, 1943 |
| 2,388,827 | Carter | Nov. 13, 1945 |
| 2,389,670 | Kerr | Nov. 27, 1945 |

FOREIGN PATENTS

| Number | Country | Date |
| --- | --- | --- |
| 159,666 | Great Britain | of 1921 |